US012789475B1

(12) United States Patent
Parkinson

(10) Patent No.: US 12,789,475 B1
(45) Date of Patent: Nov. 10, 2026

(54) THERMAL SUPPLEMENT SYSTEM FOR A HEAT-SEALING MACHINE

(71) Applicant: Force Global—ROPEX America LLC, Germantown, WI (US)

(72) Inventor: Michael Parkinson, Hubertus, WI (US)

(73) Assignee: Force Global—ROPEX America LLC, Germantown, WI (US)

( * ) Notice: Subject to any disclaimer, the term of this patent is extended or adjusted under 35 U.S.C. 154(b) by 396 days.

(21) Appl. No.: 18/390,886

(22) Filed: Dec. 20, 2023

Related U.S. Application Data

(60) Provisional application No. 63/462,004, filed on Apr. 26, 2023.

(51) Int. Cl.
*B29C 65/22* (2006.01)
*B29C 65/00* (2006.01)
*B29C 65/38* (2006.01)

(52) U.S. Cl.
CPC ............ *B29C 65/223* (2013.01); *B29C 65/38* (2013.01); *B29C 66/8181* (2013.01); *B29C 66/87* (2013.01); *B29C 66/91231* (2013.01)

(58) Field of Classification Search
CPC ... B29C 65/223; B29C 65/38; B29C 66/8181; B29C 66/87; B29C 66/91231
See application file for complete search history.

(56) References Cited

FOREIGN PATENT DOCUMENTS

EP 2724840 A1 * 4/2014 ......... B29C 66/1352

* cited by examiner

*Primary Examiner* — Christopher W Raimund
(74) *Attorney, Agent, or Firm* — Boyle Fredrickson, S.C.

(57) ABSTRACT

A system for providing thermal supplementation in a heat-sealing machine is provided to facilitate heating and/or cooling of a heat seal band, externally by way of conduction. The system may be used to provide ancillary thermal control of the heat seal band during use. The system may further be implemented to perform a heat verification procedure that allows an evaluation of a heat-sealing machine's perceived value of a heat-seal band's temperature, based on a calculated temperature, with its known temperature value and facilitate a tuning of the heat-sealing machine's assessment of the heat-seal band's temperature. If there is a discrepancy between the calculated and actual temperature, a tuning procedure, such as (re)defining a control characteristic such as a revised or tuned TCR (temperature coefficient resistance) value for the heat seal band, may be used to attenuate that difference.

11 Claims, 10 Drawing Sheets

THERMAL SUPPLEMENT SYSTEM FOR A HEAT-SEALING MACHINE

CROSS REFERENCE TO RELATED APPLICATION

This application claims the benefit of U.S. provisional application 63/462,004 filed Apr. 26, 2023 and hereby incorporated by reference.

FIELD OF THE INVENTION

The invention relates generally to heat-sealing and, in particular, to a system for providing ancillary thermal control of a heat seal band, such as by way of conduction.

BACKGROUND OF THE INVENTION

In heat-sealing or welding of thermoplastic materials, the integrity of the seal or weld is greatly important, not only for aesthetics, but also for the performance of the product(s) in which the seal or weld is incorporated. Some products or applications have heightened or otherwise strict quality requirements for heat-seal produced seals or welds. Examples can be found in numerous industries and applications, such as food, health, and industrial applications, that may have strictly defined cleanliness, surface uniformity, and/or other standards or specifications in which thermoplastic seal or weld characteristics may be relevant. The energy or heat applied to the materials being sealed or welded is a primary factor that can influence seal or weld characteristics. Accordingly, substantial efforts are typically made to try to provide heat-sealing systems that can heat their heat seal bands to appropriate temperatures to comply with any corresponding standard or specification for particular sealing or welding operations.

However, achieving appropriate heat-sealing or welding temperatures can be challenging, especially when trying to provide uniform heat distribution about a contoured heat-seal surface. This is especially true for heat-sealing procedures that implement closed-perimeter or closed-contour heat-seal bands due to their control complexity compared to relatively straight forward control methodologies for open contour heat seal bands, such as bar-type or straight bands.

Control methodologies for some closed-contour heat-seal bands, such as those implemented in impulse heat-sealing procedures, involve heat-sealing procedures that can require cyclic heating and cooling phases. This can include allowing the heat-seal or weld to cool while the workpiece's components are held under pressure. During the heating phase(s), monitoring temperatures and adjusting energy application is important for producing acceptable heat-seals or welds. Different workpiece components can have different thermal characteristics, yet each procedure will have a particular target temperature and target application time and pressure.

Many impulse heat-sealing procedures allow the heat-seal or weld to cool, at least to some extent, while the workpiece's components are held under pressure. This is typically done by passive-type cooling in which the heat seal band is deenergized or placed into a standby mode, while its temperature is correspondingly reduced over time. The time required to allow passive cooling of the heat-seal band between its heating phases adds to the overall time required for heat-sealing procedures or sessions.

During a heat-sealing procedure, although the temperature of the workpiece itself is an important consideration, measuring its temperature or that of the band of the heat-seal band is challenging. The temperatures required for heat-sealing procedures are substantially high, and space within heat-sealing machines can be constrained. Efforts have been made to avoid incorporating prohibitively expensive high-temperature probes by instead deriving temperatures based on measuring values of other characteristics in the system. One method is calculating temperatures and changes in temperatures as a function of resistance values. One example of that method relies on Ohm's law and uses changes in resistance values to derive temperature-related values. Since it is difficult to measure changes in resistance values, efforts have been made to better calculate such values. In one example, current is measured going to the heat seal-band, such as at a current transformer. Voltage is measured at the source, such as the bus block that delivers power to the heat seal-band. A change in resistance value is calculated from these values and is based on a known temperature coefficient of the heat-seal band, and the temperature and/or temperatures change can be calculated as a function of the change in resistance.

Although such calculations provide temperature values, certain result anomalies can be experienced that relate to the configurations of the heat-seal band and interacting system components. Notably, the calculations are based on sensed values of the overall heat-seal band. However, since heat-seal bands have multiple components or segments the overall system characteristics are related at least generally to a compilation of the those of the underlying components or segments. Since various energy transmission-related characteristics of the heat-seal band's components or segments may differ at any given time, an apparent constant average value may be based on vastly different underlying constituent values that contribute to the average or overall value. In one example, over a period of time in which the calculated temperature of the band appears to be uniform or constant, the band itself may experience momentary time segments of localized cooling at the same time that the conductive bands may experience heating. Anomalous interpretations of uniform heating states of the band when not all of the calculated heat is being realized through emission at the band can lead to undesirable performance characteristics of the heat-seal or weld.

Besides potential in-use controls issues, further challenges are associated with pre-use set up and calibration of heat-seal bands, which try to establish appropriate in-use temperatures of the heat-seal bands, such as performance verification or validation before starting the actual use process. In systems that monitor voltage and current to calculate heat-seal band temperature(s), preliminary calibration or correction routines may be performed. Those may include, for example, measuring the heat-seal band's default or ambient temperature as well as energizing the heat-seal band and measuring its heated temperature directly with a thermocouple that is attached to the heat-seal band. If the heat-seal band's measured temperature differs from the process' target temperature, then adjustments can be made to various control parameters to try to achieve the target temperature.

Despite such calibration and correction routines, there are still potential discrepancies between actual in-use temperatures compared to target in-use temperatures. It can be difficult to accurately measure the heat-seal band's temperature, even directly with a temperature measuring device such as a thermocouple, which may compromise the integrity of the temperature measurement(s). As a result, the directly measured temperature during setup may not correlate to an actual in-use temperature with sufficient accuracy. Heat seal bands are generally small and/or lightweight or have low mass values, making them highly dynamic in a thermodynamic sense, which complicates measuring their temperatures accurately. Furthermore, although there are generally industry-accepted TCR (temperature coefficient resistance) values for, e.g., various different materials from which the heat-seal bands are made and that can be used in the temperatures calculations by the control system, actual TCR values for the corresponding materials may slightly stray from such predetermined linear values by, instead, exhibiting somewhat less linear characteristics, at least at certain temperatures.

Additionally, although a particular heat-seal band may be validated or confirmed to operate at a certain temperature by implementing, e.g., a particular TCR value and other control parameters, there can be variations in actual performance between heat-sealing machines because of the numerous components and interactions between them and associates potential variations between each. Accordingly, even though each individual component of a heat-seal machine may have its performance or operation individually verified, confirming actual performance of a particular heat-seal band in a particular machine likely requires a per-machine assessment for the most accurate validation of the particular machine with a particular heat-seal band.

Managing these various challenges to try to accurately verify sealing or welding temperatures has proven difficult.

SUMMARY OF THE INVENTION

In accordance with a first aspect of the invention, a system is provided for thermal supplementation in a heat-sealing machine to facilitate heating and/or cooling of a heat seal band, externally by way of conduction.

In accordance with another aspect of the invention, the system may provide ancillary thermal control of the heat seal band during use of the heat-sealing machine, for example, by thermally driving the heat-seal band to a target default or other temperature when the band is in a standby mode between heating phases.

In accordance with another aspect of the invention, the system utilizes thermal supplementation for verifying and/or tuning heat-seal band performance during a heat verification procedure.

In accordance with another aspect of the invention, the system may include a thermal emitter device that can be implemented as a verification standard tool with an ancillary heater for a heat-seal band in a standby mode, conductively heating the band to a known temperature. The conductively heated heat-seal band may be evaluated to provide a calculated temperature value of the heat-seal band. A difference between the heat-seal band's calculated and actual temperature may be attenuated by modifying at least one control parameter.

In accordance with another aspect of the invention, the control system evaluates associated voltage and current values for the heat-seal band to calculate changes in resistance values to derive temperature-related values for the heat-seal band. The current value may be measured at a current transformer and the voltage value may be measured at the band or contour itself, such as by way of a volage sensing wire that is independent of the heat-seal band's current transmission wire or other conductor.

In accordance with another aspect of the invention, differences between the heat-seal band's calculated and actual temperature may be attenuated by adjusting or redefining a TCR (temperature coefficient resistance) to an updated or TTCR (tuned temperature coefficient of resistance) value. The TTCR is selected to facilitate the control system's calculation providing a calculated temperature value that corresponds to the actual temperature value, at least sufficiently closely. The actual temperature value may correspond to the measured temperature value of the system's ancillary heater that is actively heated to transmit its heat into the deenergized or deactivated heat seal band.

In accordance with another aspect of the invention, the system's ancillary heater may include a body that is made from a highly thermally conductive material, such as aluminum. The heater's body is substantially larger than that of the heat-seal band, with the mass of heater's body being multiples or an order of magnitude more than the mass of the heat-seal band. The ancillary heater may include a heating element that is housed inside the heater body. A temperature sensor, which may be a thermocouple, may be attached directly to the heater body for performing a direct measurement of the ancillary heater's temperature.

In accordance with another aspect of the invention, the control system may control the heating of the ancillary heater during a temperature verification or set up procedure in a manner that maintains the ancillary heater at a constant temperature. The control system includes a constant temperature or heat controller, which may be implemented as a closed-loop controller, such as a PID (proportional-integral-derivative) controller to substantially and constantly maintain the ancillary heater at the commanded or target temperature during the procedure.

In accordance with another aspect of the invention, during a temperature verification procedure, a basepoint setup procedure may be performed. This may include defining a forced or created ambient temperature value as a zero-point in relation to the TCR, which provides a datum as a reference at a specific known temperature. The thermal emitter device may be slightly heated or cooled to achieve a datum temperature that is selected based on the particular implementation or end-use environment of the heat-sealing machine. A particular datum temperature is determined based on factors such as an ambient temperature of the heat-sealing machine's particular end-use environment, typically with a value of between about 0-degrees C. to about 35-degrees C. For example, whereas a cold-room type application may correspond to a datum temperature of between about 0-degrees C. and 2-degrees C., a clean-room type application may correspond to a datum temperature of between about 20-degrees C. and 22-degrees C. The datum temperature may provide a basepoint temperature of the controller's temperature curve and may be verified by comparing the heat-seal band's calculated temperature with its actual temperature that corresponds to temperature of the ancillary heater. The constant heat controller commands the ancillary heater of the thermal emitter to heat to the created ambient or datum temperature. While the constant heat controller maintains the ancillary heater at the datum temperature, the control system evaluates voltage and current of the heat seal band. Based on the voltage and current values, the control system calculates the heat seal band's resistance and further calculates the heat seal band's temperature as a function of its resistance and the TCR value. A verification assessment is performed to determine whether the heat seal band's calculated datum temperature sufficiently matches its actual temperature.

In accordance with another aspect of the invention, a process mean setup procedure may be performed, which allows for verifying the heat-seal band's achieving the target temperature as a mean operational temperature for the sealing or welding procedure or the process target temperature. The constant heat controller commands the ancillary heater of the thermal emitter device to heat to the process target temperature. While the constant heat controller maintains the ancillary heater at the process target temperature, the control system again evaluates voltage and current of the heat seal band and calculates its resistance and then its temperature as a function of its resistance and the TCR value. A verification assessment is performed to determine whether the heat seal band's calculated process target temperature sufficiently matches its actual temperature.

In accordance with another aspect of the invention, upper and lower specification limits may be verified. A sealing or welding process may specify a particular temperature limit(s), such as an upper temperature limit and a lower temperatures limit of an acceptable range of operational temperatures. The heat seal band's temperature may be verified for any such defined temperature limits. For each of the upper and lower specification limits, the constant heat controller commands heating and holding the ancillary heater to the respective temperature. The control system calculates the heat-seal band's temperature from its resistance and TRC values, and the calculated upper and lower limit temperatures are compared to the actual upper and lower limit temperatures that were achieved by the ancillary heater.

According to another aspect of the invention, if a calculated temperature of the heat-seal band differs from its known actual temperature during a verification procedure, then the controls may be tuned by, for example, modifying the TCR value to a new value that provides a match between the values for the calculated and known or observed values.

These and other features and aspects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the scope of the invention.

Figure 1:
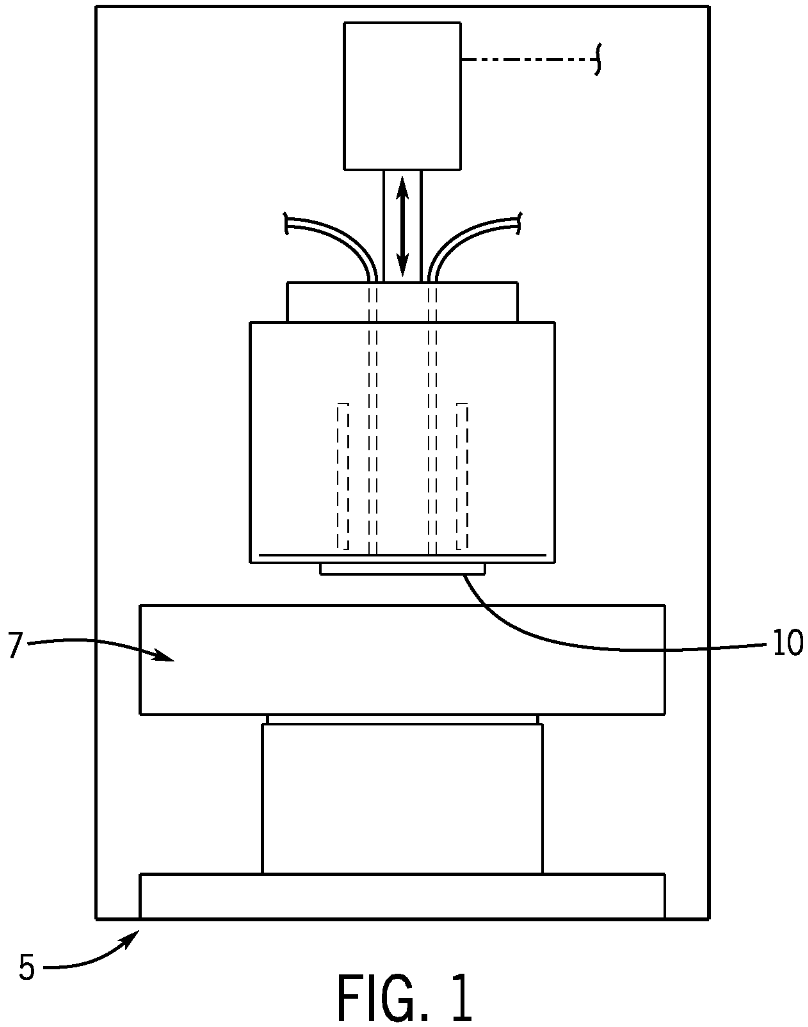
FIG. 1 is a schematic representation of an impulse heat-seal system incorporating a system for verifying and tuning heat-seal band performance in accordance with various aspects of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to the drawings and initially to FIG. 1, a system for thermal supplementation in a heat-sealing machine to facilitate heating and/or cooling of heat seal band is represented as system 5. System 5 is configured to externally heat and/or cool a heat seal band, externally or by way of conduction, which may occur while the heat-seal band is in an inactive state or standby mode. System 5 includes an auxiliary thermal system with a thermal emitter device 7 that, as explained in greater detail elsewhere, selectively heats and/or cools a heat-seal band 10 as a thermal supplement. System 5 controls the thermal emitter device 7 to provide ancillary thermal control of the heat-seal band 10, for example, without utilizing the heat-seal band's 10 resistive heating capability. This allows for ancillary thermal control of the heat-seal band 10 by thermally driving the heat-seal band 10 to various target temperatures at various times, such as between heating phases of a heat-sealing procedure and/or during or between various phases of a heat verification procedure. System 5 may further control the thermal emitter device 7 during the heat verification procedures to facilitate tuning performance characteristics to improve the accuracy of the heat-seal band's 10 heating during use in a sealing or welding procedure. This may include an evaluation of the heat seal band's 10 calculated temperature compared to its actual temperature so that its control(s) may be adjusted to more closely correlate the heat seal band's 10 calculated and actual temperatures.

Figure 2:
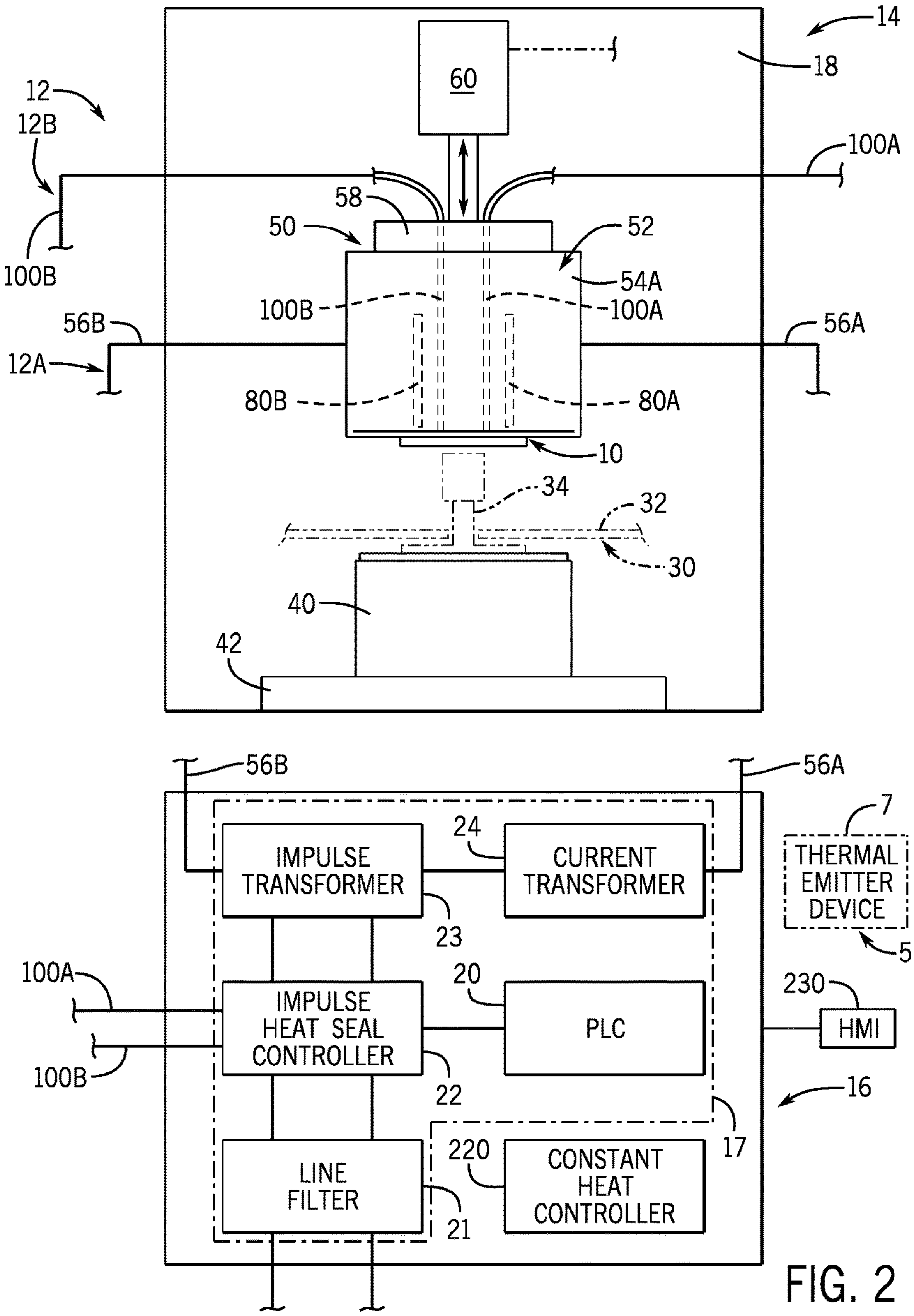
FIG. 2 is another schematic representation of an impulse heat-seal system incorporating a system for verifying and tuning heat-seal band performance in accordance with various aspects of the invention.

Referring now to, FIG. 2 various components are schematically shown in-use during a sealing or welding process, for example, after verification or validation of the heat-seal band's 10 performance characteristics with system 5. The heat-seal band 10 in this illustrated example is provided with a multi-electrical-path arrangement 12 that is configured with separate electrical paths for current load transmission and voltage sensing. The multi-electrical-path arrangement 12 includes a first electrical path as a current load transmitting path 12A and a second electrical path as a voltage sensing path 12B that connect and extend through different segments of the heat-seal band 10, which is shown being used with a thermal joining or welding system to perform the heat-sealing operation, represented here as an impulse heat-seal system 14. Impulse heat-seal system 14 includes a control system 16 and a heat-seal machine 18. Control system 16 may provide overall machine controls or a machine controller 17 that includes a controller 20 that is typically implemented as a PLC (programmable logic controller), a microcontroller, or some other computer that executes various stored programs while receiving inputs from and sending commands to the subsystems of components of the impulse heat-seal system 14. Control system 16 includes various power source systems and components, such as a line filter 21, an impulse heat seal controller 22, an impulse transformer 23, and a current transformer 24 for delivering electrical power to various components of the impulse heat-seal system 14.

Still referring to FIG. 2, heat seal machine 18 is configured to perform a thermal joinder procedure such as heat sealing or welding on a workpiece 30, which typically includes multiple workpiece components. Workpiece 30 is shown here with a sheet-like substrate 32 that may, for example, be a segment of a bag or other polymeric or foil enclosure. A discrete component, shown as a fitting 34 that is represented here as having a port-like configuration, is being joined to the substrate 32 of workpiece 30 in this example. Workpiece 30 is shown to be supported from below by a counter-tool 40 that is connected to a counter holder or plate 42, which is supported by a frame of the heat seal machine 18.

Still referring to FIG. 2, heat seal machine 18 includes an impulse heat-sealing tool 50 that holds the heat-seal band 10 by clamping it in a bus bar assembly 52 that typically includes a pair of substantially mirror-image bus bars 54A, 54B, only one which is visible in this view. The current load transmitting path 12A electrically connects the heat-seal band 10 to a power source of the control system 16 by way of load lines or current load conductors 56A, 56B that extend from the control system 16 to terminals on the bus bars 54A, 54B. Accordingly, heat seal band 10 receives and transmits electrical current for its heating by way of the current load transmitting path 12A, including the bus bars 54A, 54B and current load conductors 56A, 56B.

Still referring to FIG. 2, toward the top of the impulse heat-sealing tool 50, an insulated tie plate 58 connects the bus bar assembly 52 halves or bus bars 54A, 54B (FIG. 2) to each other. An actuator 60 connects to a mount of the tie plate 58 and drives the heat-sealing tool 50 into reciprocation between a released or retracted position (shown), in which the workpiece's 30 components can be arranged before their heat-sealing; and an engaged or extended position (not shown), in which the heat-sealing tool 50 is moved downwardly to apply pressure and heat from the heat seal band 10 to the workpiece 30 to perform the heat-sealing procedure. Typically, during the heat-sealing procedure, the heat-sealing tool 50 holds the workpiece 30 under pressure against the counter-tool 40 and allows the weldment to cool under pressure to form the weld or heat-seal.

Figure 3:
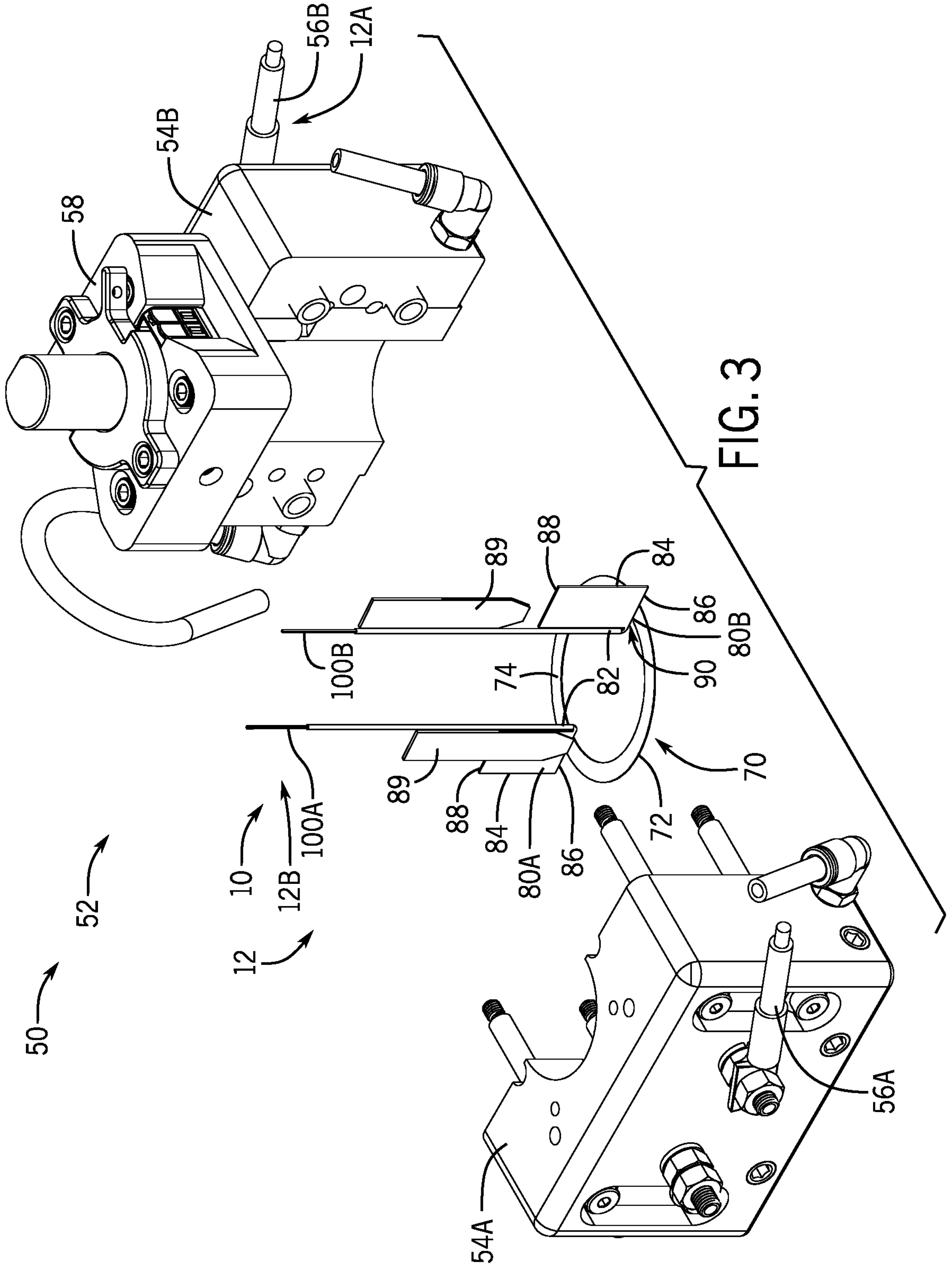
FIG. 3 is a partially exploded isometric view of a heat-seal tool implementing a heat-seal band in accordance with various aspects of the invention.

Referring now to FIG. 3, the heat-seal band 10 includes a band 70, shown here with a circular or ring-shaped closed-perimeter or closed-contour configuration. Band 70 has a lower or workpiece-facing surface 72 that is configured to direct heat toward the workpiece 30 (FIG. 4) to perform the heat-sealing operation. An opposite upper or tab-facing surface 74 faces upwardly toward the bus bar assembly 52.

Still referring to FIG. 3, heat seal band 10 further includes a conductive tab arrangement, shown here as a pair of conductive tabs 80A, 80B, which are defined within the current load transmitting path 12A. The tabs 80A, 80B are generally planar structures that are parallel to and coplanar with each other, extending perpendicularly upward from the band's tab-facing surface 74. In this implementation, each tab 80A, 80B has a generally rectangular perimeter shape and is taller than it is wide. Tabs 80A, 80B are shown here as being wider than the material spanning between the band's ID (inside diameter) and OD (outside diameter), with lateral upright inner and outer side edges 82, 84 of the tabs 80A, 80B arranged inwardly and outwardly beyond respective inner and outer circumferential edges of the band. A bottom edge 86 is arranged toward the band 70, sitting against the tab-facing surface 74, defining a tab to band (tab/band) junction 90. An upper edge 88 is arranged opposite the band 70, away from the tab/band junction 90. A tab cover 89 may selectively overlie tab 80A, 80B, for example, to influence characteristics of energy transfer through the tab/band junction 90.

Figure 4:
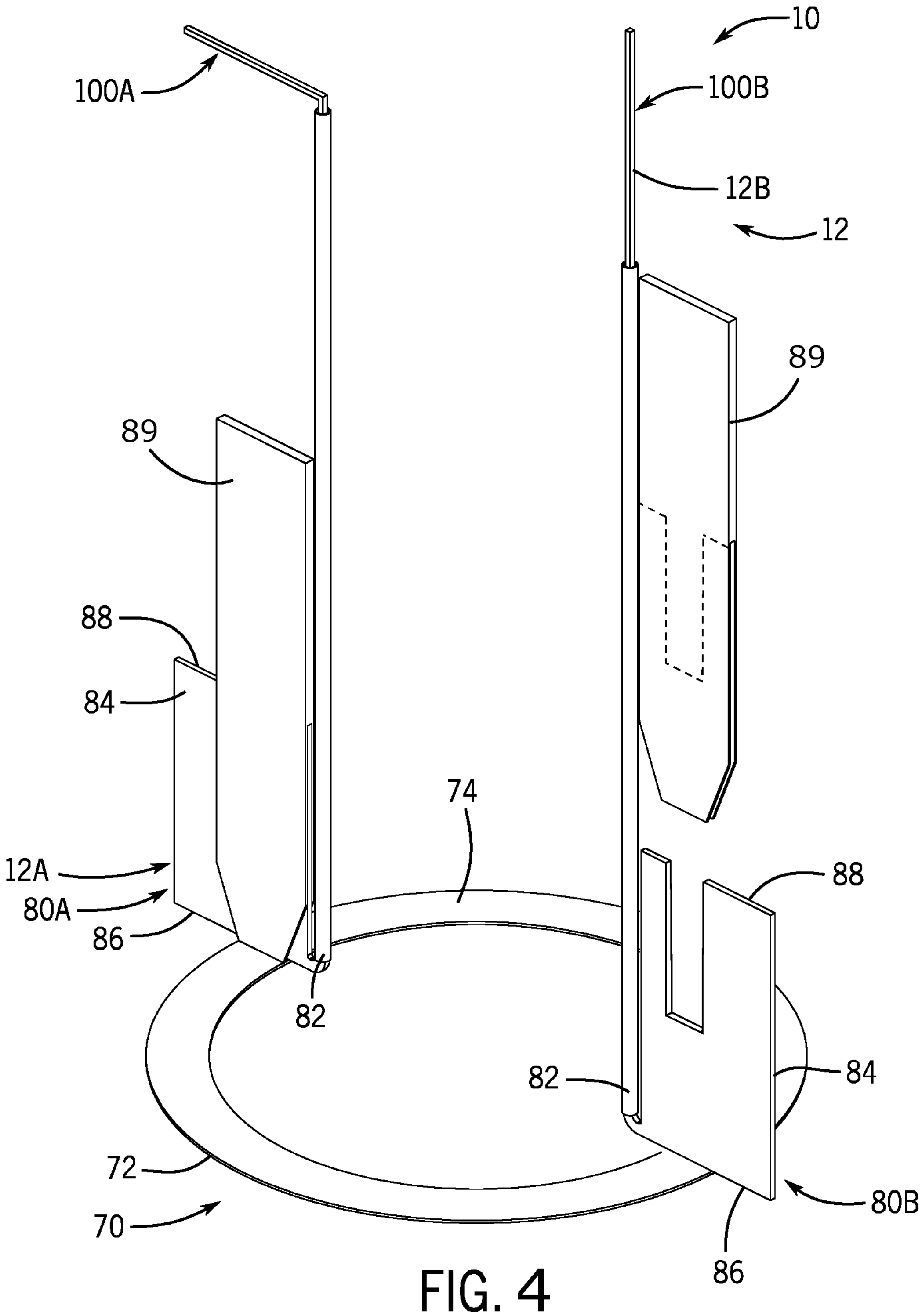
FIG. 4 is a partially exploded isometric view of the heat-seal band of FIG. 3.

Referring now to FIG. 4, the voltage sensing path 12B provides signal transmission for monitoring the voltage across the band 70 by way of, for example, a voltage measurement or sensing tab, wire, and/or other conductor that provides signal wire-type transmission of voltage related information, shown here as voltage sensing conductors 100A, 100B. Voltage sensing conductors 100A, 100B are shown here arranged inboard or inwardly with respect to the band 70. However, it is understood that the voltage measurement or sensing tabs or conductors 100A, 100B can be arranged in different positions, for example, on the outside or outwardly of band 70. The particular arrangement of voltage sensing conductors 100A, 100B may be based on, for example, structural characteristics or configurations of cooperating components, such as aspects of tool 50 that facilitate acceptable routing of the voltage sensing conductors 100A, 100B.

Figure 5:
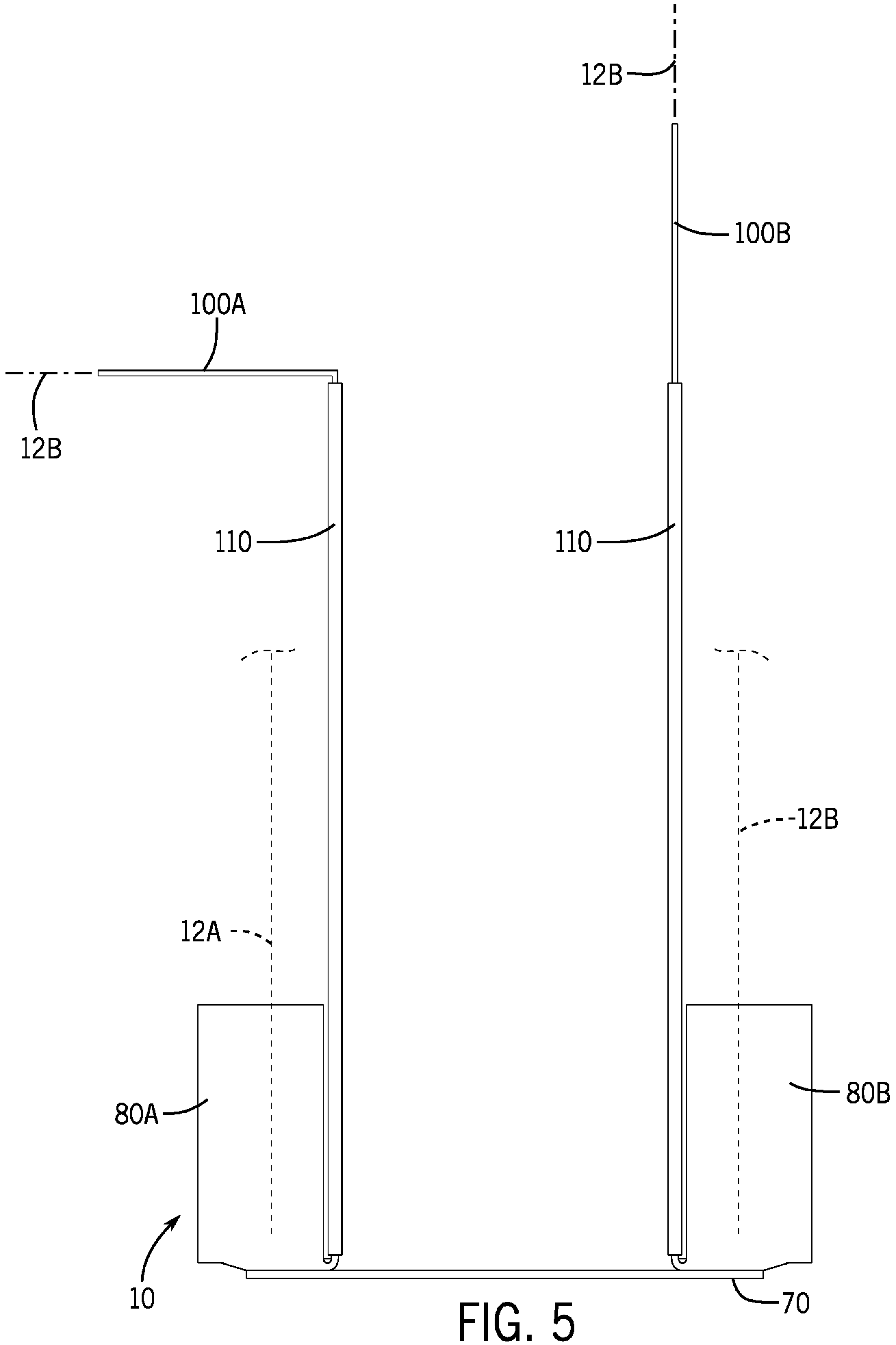
FIG. 5 is a front elevation view of the heat-seal band of FIG. 3.

Referring now to FIG. 5, the current load transmitting path 12A extends through the entire length of each of tabs 80A and 80B. The current load transmitting path 12A is arranged outwardly of the voltage sensing path 12B. Voltage sensing path 12B extends through the voltage sensing conductors 100A, 100B, inwardly of the current load transmitting path 12A. Each of the voltage sensing conductors 100A, 100B is shown here with an insulated sleeve 110. Sleeve 110 is made from, for example, a polymeric, elastomeric, or other material that electrically insulates the voltage sensing conductors 100A, 100B from the current load transmitting path 12A and various other components of the impulse heat seal system 14 (FIG. 2).

Figure 6:
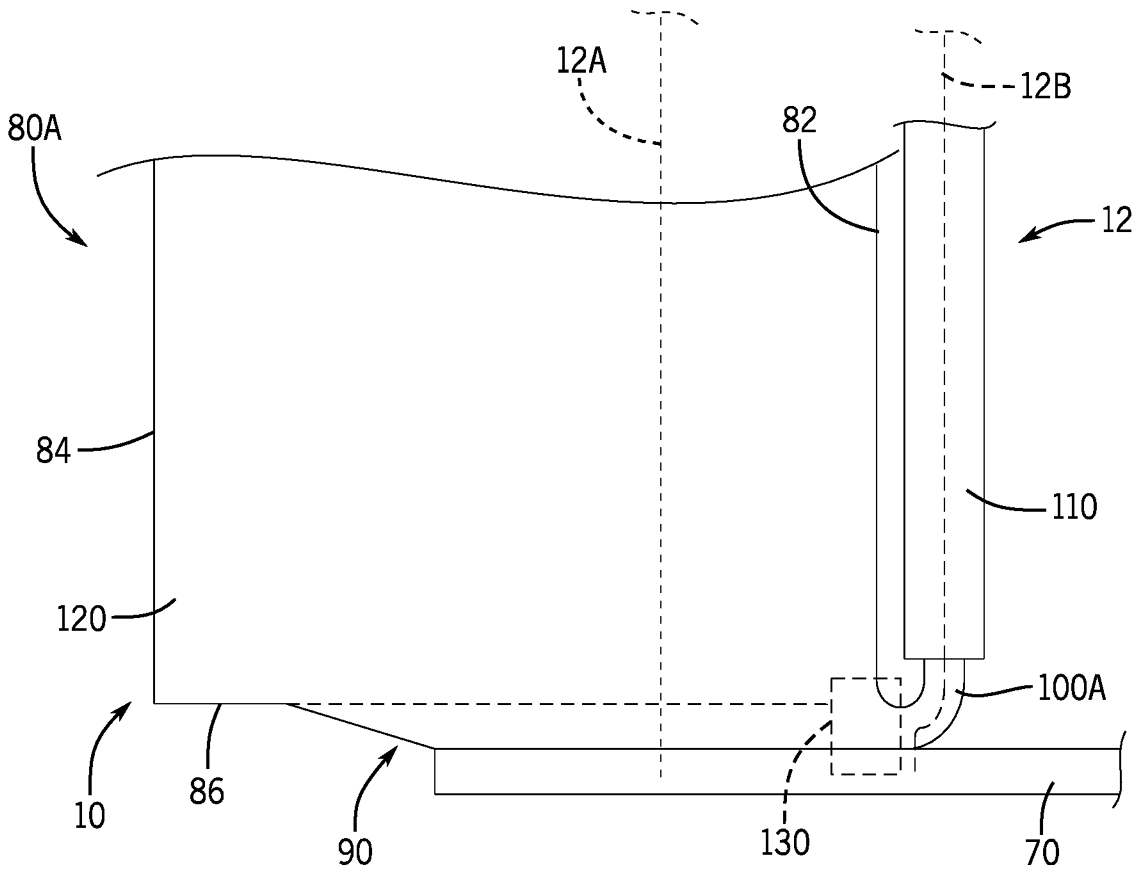
FIG. 6 is a close-up front elevation view of a portion of the heat-seal band of FIG. 3.

Referring now to FIG. 6, one tab/band junction 90 and its cooperating components is shown here at an intersection of the tab 80A, voltage sensing conductor 100A, and band 70, as a close-up of a corresponding portion of that shown in FIG. 4. This arrangement is substantially identical to those of other tab/band junctions 90, such that they are mirror images of the intersection of tab 80B, voltages sensing conductor 100B, and band 70. Current load transmitting path 12A includes a main body segment 120 of tab 80A. A node 130 may be defined as a transitional segment of material that interconnects the tab 80A and voltage sensing conductor 100A, which may be arranged or adjacent the tab/band junction 90.

Figure 7:
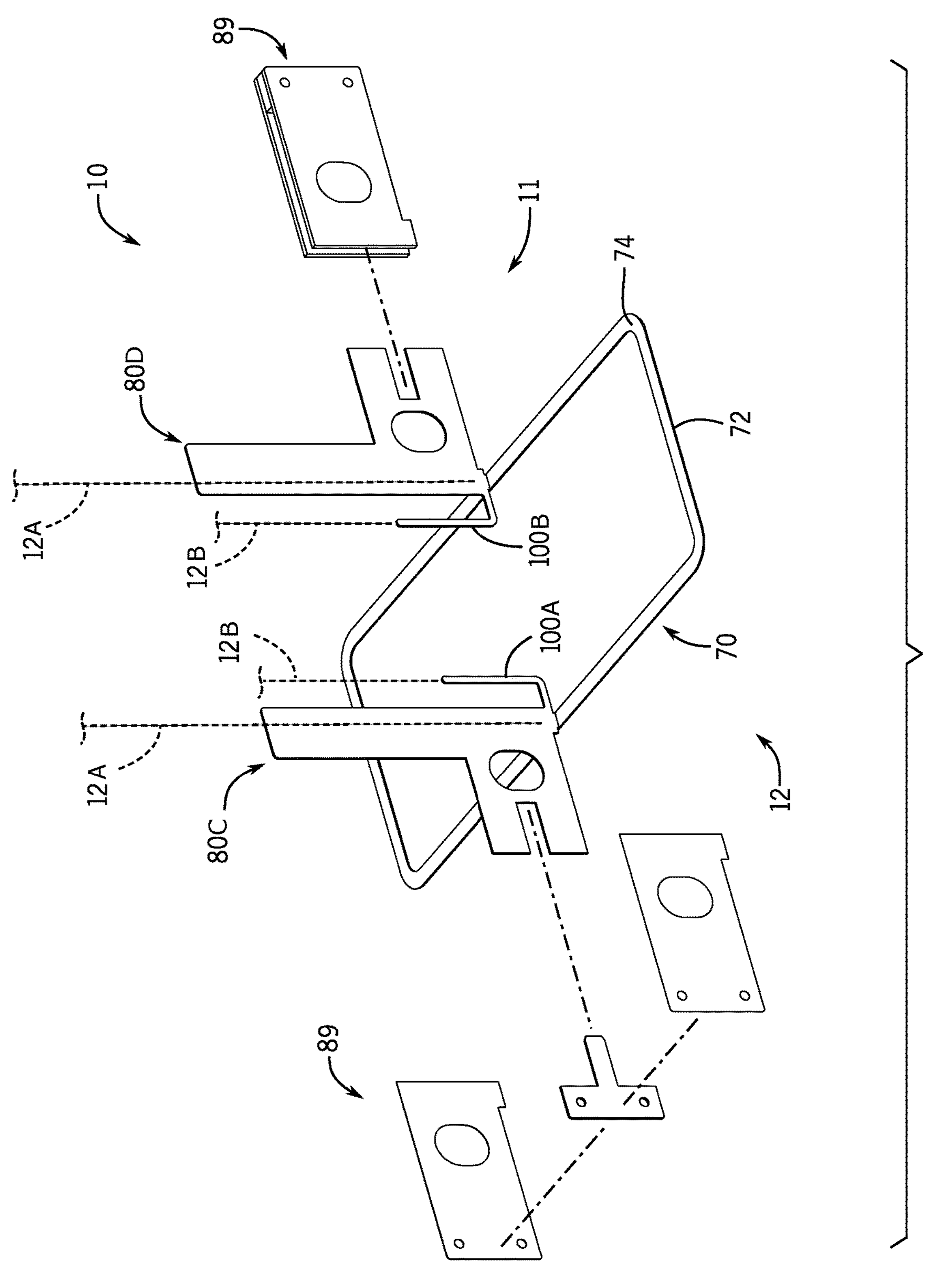
FIG. 7 is a partially exploded view of another heat-seal band in accordance with various aspects of the invention.
Figure 8:
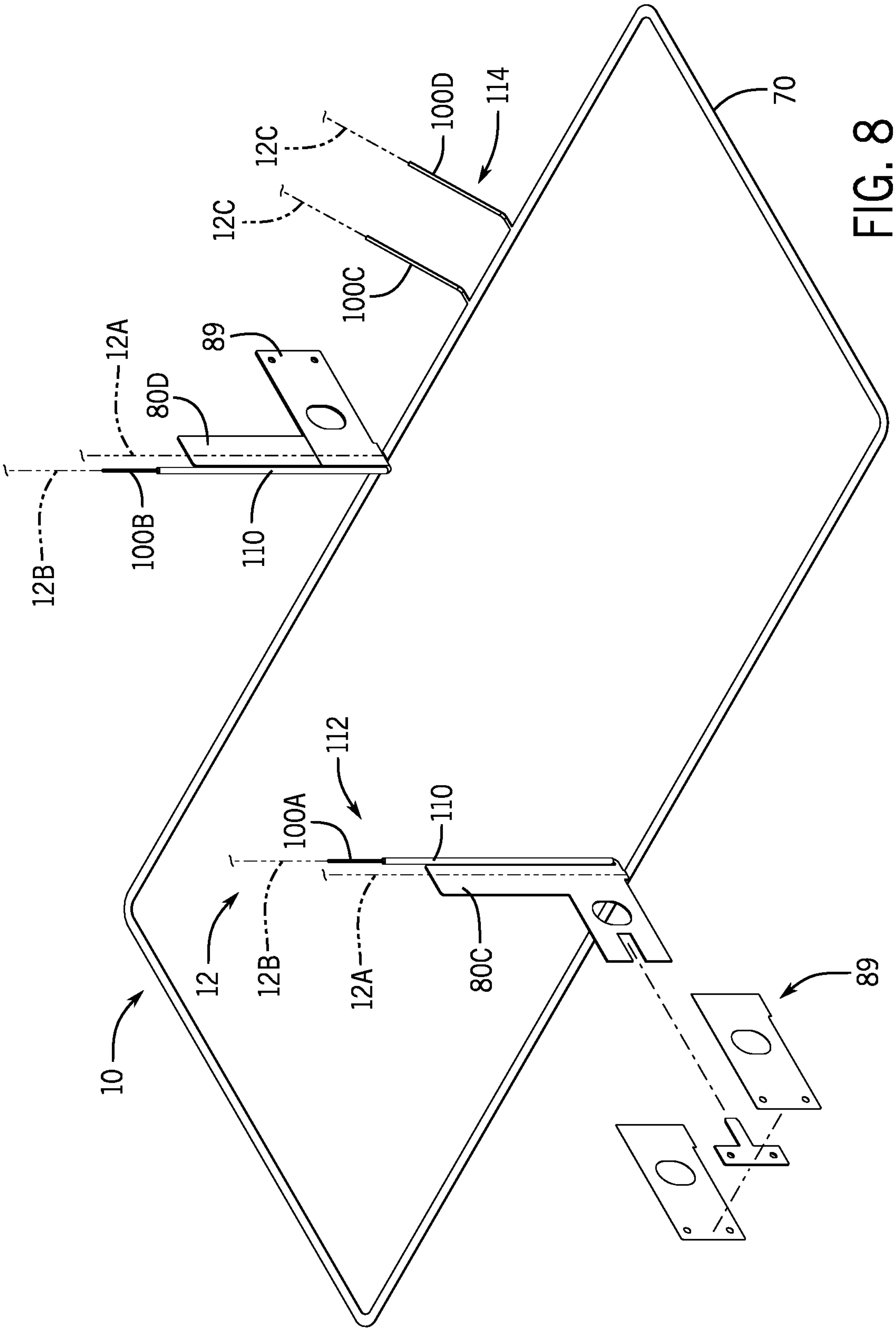
FIG. 8 is a partially exploded view of another heat-seal band in accordance with various aspects of the invention.

Referring generally to FIGS. 7 and 8, the heat-seal bands 10 shown here differ from that shown in FIG. 4 in the following ways. Compared to the generally linear or rectangular tabs 80A, 80B of FIG. 4, heat-seal band's 10 tabs 80C, 80D shown in FIGS. 7-8 have L-shaped configurations. L-shaped tabs 80C, 80D may implement tab covers 89, shown here configured to receive them in generally sideways directions.

Referring now to FIG. 8 and with background reference to FIG. 2, the multi-electrical-path arrangement 12 is shown with more than one volage sensing path. In this example, a third electrical path is defined as an additional or third voltage sensing path 12C. This allows the control system 16

(FIG. 2) to rely on signals from more than one set of voltage sensing conductors while controlling the energizing of heat seal band 10 to provide its temperature control. The multiple sets of voltage sensing conductors may be implemented as components of different subsystems of control system 16, such as a primary control system that is used in the active temperature control of heat seal band 10 and a secondary control system which may provide a confirmatory check on the heating performance, such as identifying temperature anomalies at a location(s) of the heat-seal band 10 that is spaced from or as a subset with a location used by the primary control system. Voltage sensing conductors 100A, 100B may define a first set 112 of voltage sensing conductors at or adjacent to the band 70 that are implemented by the control system's 16 primary control system. The primary control system may use signals from the first set 112 of voltage sensing conductors 100A, 100B as part of a determination in which temperature and/or temperatures change can be calculated as a function of a change in resistance, to facilitate the control system's 16 active control of the heat seal band 10. Voltage sensing conductors 100C, 100D may define a second set 114 of voltage sensing conductors at a location that is spaced from the first set 112, shown here extending directly from a portion of band 70. Control system's 16 secondary control system may utilize signals from second set 114 of voltage sensing conductors 100C, 100D in, for example, a passive or confirmatory manner to determine temperature in a similar way at that location and then compare the temperatures at the first and second sets 112, 114. It is understood that, in some implementations, control system 16 may use the first and second sets 112, 114 in the opposite way(s). Accordingly, the control system's 16 primary control system may instead utilize the second set 114 of voltage sensing conductors 100C, 100D for active control of the heat seal band 10 and the secondary control system may utilize the first set 112 of voltage sensing conductors 100A, 100B as a passive-check or in a confirmatory manner to determine temperature. Regardless, comparing calculated temperatures from the first and second sets 112, 114 facilitates identifying potential temperature anomalies that may correspond to non-uniform heating of the heat-seal band 10. This allows control system 16 to control the energization of heat-seal band 10 to take corrective action and/or send an alert to an operator of such condition.

Still referring to FIG. 8, the first and second sets 112, 114 are shown with different spacings between their respective voltage sensing conductors 100A, 100B, and 100C, 100D. Voltage sensing conductors 100A, 100B of the first set 112 are shown on generally opposite sides or segments of band 70, such as approximately equidistant from each other as measured in both directions about the band's 70 periphery as an outside set. Comparatively, the voltage sensing conductors 100C, 100D are shown substantially closer to each other and on the same or a common segment of the band 70, so that their spacing is a minor fraction of the overall perimeter length of band's 70 periphery as an inside set. The voltages sensing conductors 100C, 100D of the second set 114 are shown adjacent to each other and the second set 114, both of which are between the voltage sensing conductors 100A, 100B of the first set 112. This may allow for a localized temperature evaluation as a passive confirmatory "spot check" that can be utilized by control system 16 (FIG. 2) in evaluating temperature uniformity about the band 70. As previously mentioned, in some implementations, the inside set or second set 114 may be used to provide active control based on the corresponding localized temperature evaluation.

Regardless of the particular configuration of the tab/band junction 90, when in the heating mode, the heat-seal band 10 defines a high energy state for heating a workpiece during a heat-sealing procedure. In the high energy state, the heat-seal band 10 receives a high level of current through the current load transmitting path 12A (FIG. 3). When in a standby mode, the heat-seal band 10 defines a low energy state for monitoring a characteristic of the heat-seal band, such as monitoring a voltage by way of the voltage sensing path 12B (FIG. 3) for calculating the heat-seal band's 10 temperature. The current delivered through the load transmitting path 12A during the standby mode's low energy state is a small fraction in terms of both magnitude and frequency of the current delivered through the load transmitting path 12A (FIG. 3) during the heating mode's high energy state, which prevents unintended heating of the heat-seal band 10 during the standby mode. For example, whereas the electrical transmission frequency may be between about 50 Hz and 60 Hz during the heating mode, the frequency may be between 1 Hz and 5 Hz during the standby mode.

Figure 9:
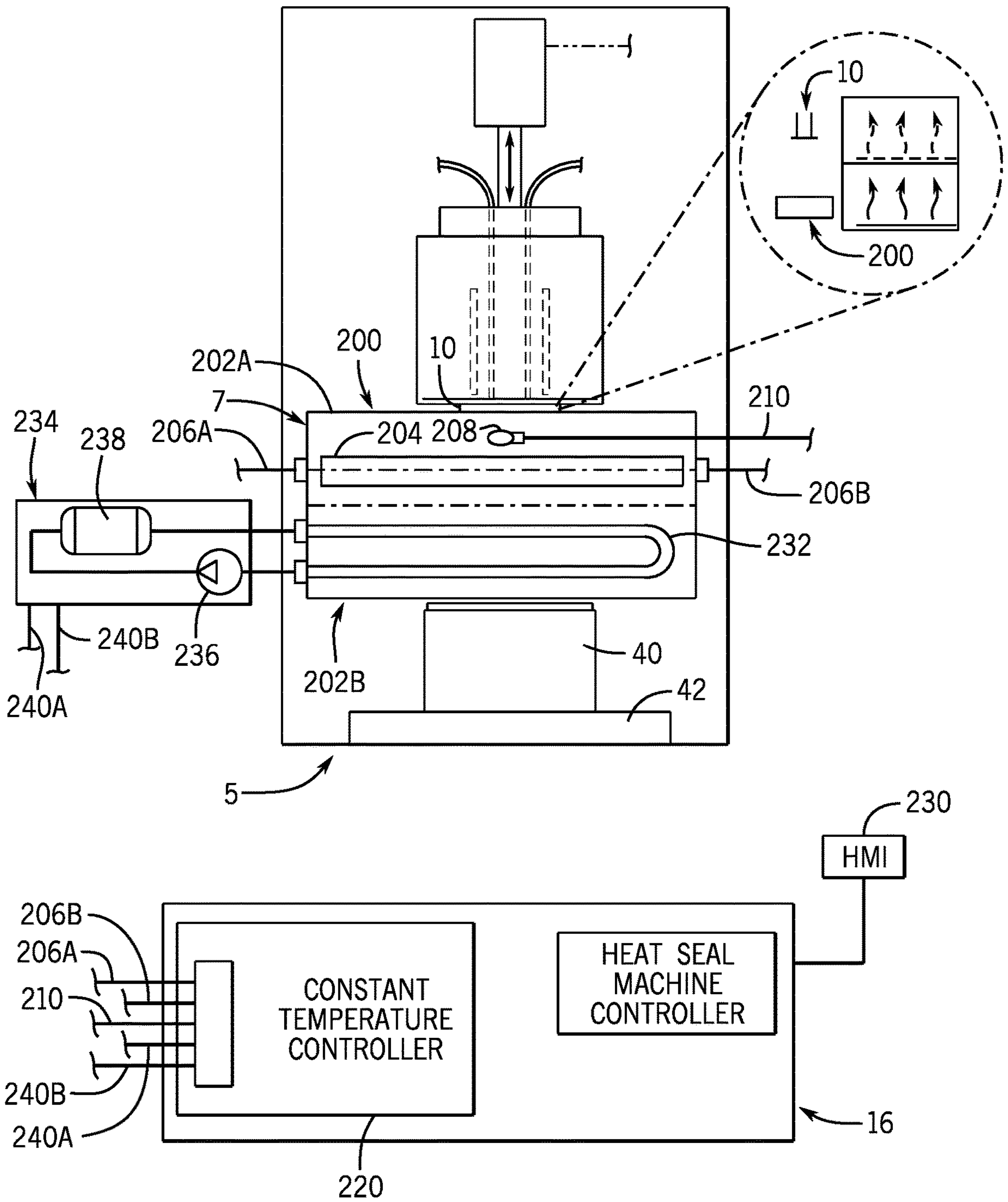
FIG. 9 is another schematic representation of an impulse heat-seal system incorporating a system for verifying and tuning heat-seal band performance in accordance with various aspects of the invention.

Referring now to FIG. 9, system 5 controls the thermal emitter device 7 to cooperate with various above-described components and features to provide ancillary thermal control of the heat-seal band 10, heating or cooling the band 10 through conduction to match or correspond to a controlled target temperature of the thermal emitter device 7. The thermal emitter device 7 is arranged or defined at counter-tool 40, for example, as integrated into or removably attached to the counter-tool 40. Accordingly, thermal emitter device 7 may support the workpiece 30 (FIG. 2) during a heat-sealing procedure or it may be removed from counter-tool 40 so that the counter-tool 40 supports the workpiece 30 (FIG. 2) during the heat-sealing procedure. Thermal emitter device 7 defines a device body 200 that is substantially larger than the heat seal band 10. The mass of the thermal emitter device's body 200 is multiple times greater than or an order of magnitude greater than the mass of the heat-seal band 10. Device body 200 is shown here configured with both heating and cooling capabilities, with a vertically stacked arrangement of heating and cooling segments that respectively define a heater 202A and a cooler 202B.

Still referring to FIG. 9, the device body 200 is made from a highly thermally conductive material, such as aluminum and may have a multi-piece construction and may include or provide, e.g., a non-stick and abrasion resistant material as a surface facing or cover, such as a PTFE fabric. A first void or cavity may be defined in the body's heating segment or heater 202A, such as between respective engaging body pieces and in which a heating element 204 is housed. Conductors 206A, 206B are attached to the heating element 204 for transmitting electrical current to energizing the heating element 204 when the heater 202A is active and in a heating mode.

Still referring to FIG. 9, a temperature sensor 208 shown here as a thermocouple 208 is mounted to the device body 200 for detecting the temperature of the thermal emitter device 7. Conductor 210 may be a signal wire for transmitting information about the status of the thermocouple 208 and therefore the temperature of the device body 200. Each of the conductors 206A, 206B, 210 may connect to a constant temperature controller 220 of the control system 16. Constant temperature controller 220 may implement a closed-loop controller, such as a PID (proportional-integral-derivative) controller that can command the heating of heating element 204 to increase the temperature of the device body 200 to a specified value and then maintain that value based on feedback from thermocouple 208. A particular target temperature at which the constant temperature controller 220 commands the heater 202A to achieve may be selected by a user, such as by a user through an HMI (human machine interface) 230.

Still referring to FIG. 9, similarly to increasing the temperature of device body 200, control system 16 may control the cooler 202B to decrease the temperature of device body 200. A second void or cavity may be defined in the body's cooling segment or cooler 202B, such as defining a coolant loop or passage 232 shown here as a U-shaped passage that extends through the cooler 202B. An inlet and an outlet of passage 232 are fluidly connected to a cooling system 234. Cooling system 234 is shown having a pump 236 and a heat exchanger 238 that cooperate with each other to cool and circulate a cooling fluid, typically a liquid coolant. Conductors 240A, 240B may connect the cooling system 234 to constant temperature controller 220 of the control system 16 for power and signal transmission to control cooling characteristics of the thermal emitter device 7 to achieve a particular target temperature for the thermal emitter device 7 and heat seal band 10.

Still referring to FIG. 9, during verification, validation, and/or tuning of the performance of heat-seal band 10, the heat-seal band 10 is lowered to engage the device body 200. This engagement of the heat-seal band 10 and body 200 provides a material-to-material thermally transmissive path, by way of conduction. A supplemental heating of the heat-seal band 10 in its standby mode is shown in FIG. 9 for temperature verification, validation, and/or tuning. As represented at the circle showing an enlarged engagement of the heat seal band and device body 200 toward the upper right portion of FIG. 9, the body 200 is the active heating structure, represented by the solid-wavy-arrows, and the heat-seal band 10 conductively receives heat by energy transferred into it from device body 200, represented by the dashed-wavy-arrows. Accordingly, heat-seal band 10 may remain in a standby mode, in its low energy state that does not resistively heat itself, while having its temperature increased by way of the thermal emitter device 7. During verification, validation, and/or tuning, substantially the only voltage across the heat-seal band is typically that associated with the ongoing monitoring of voltage and current that the control system 16 uses for determining resistance and temperature values of the heat-seal band. Accordingly, whereas the heat-seal band 10 performs as a relatively high power-consuming active resistive heater during use in a sealing or welding operation, during verification, validation, and/or tuning, the heat-seal band 10 performs similarly to a multimeter, to provide relevant information to the control system 16 for calculating its temperature while in its standby mode.

Figure 10:
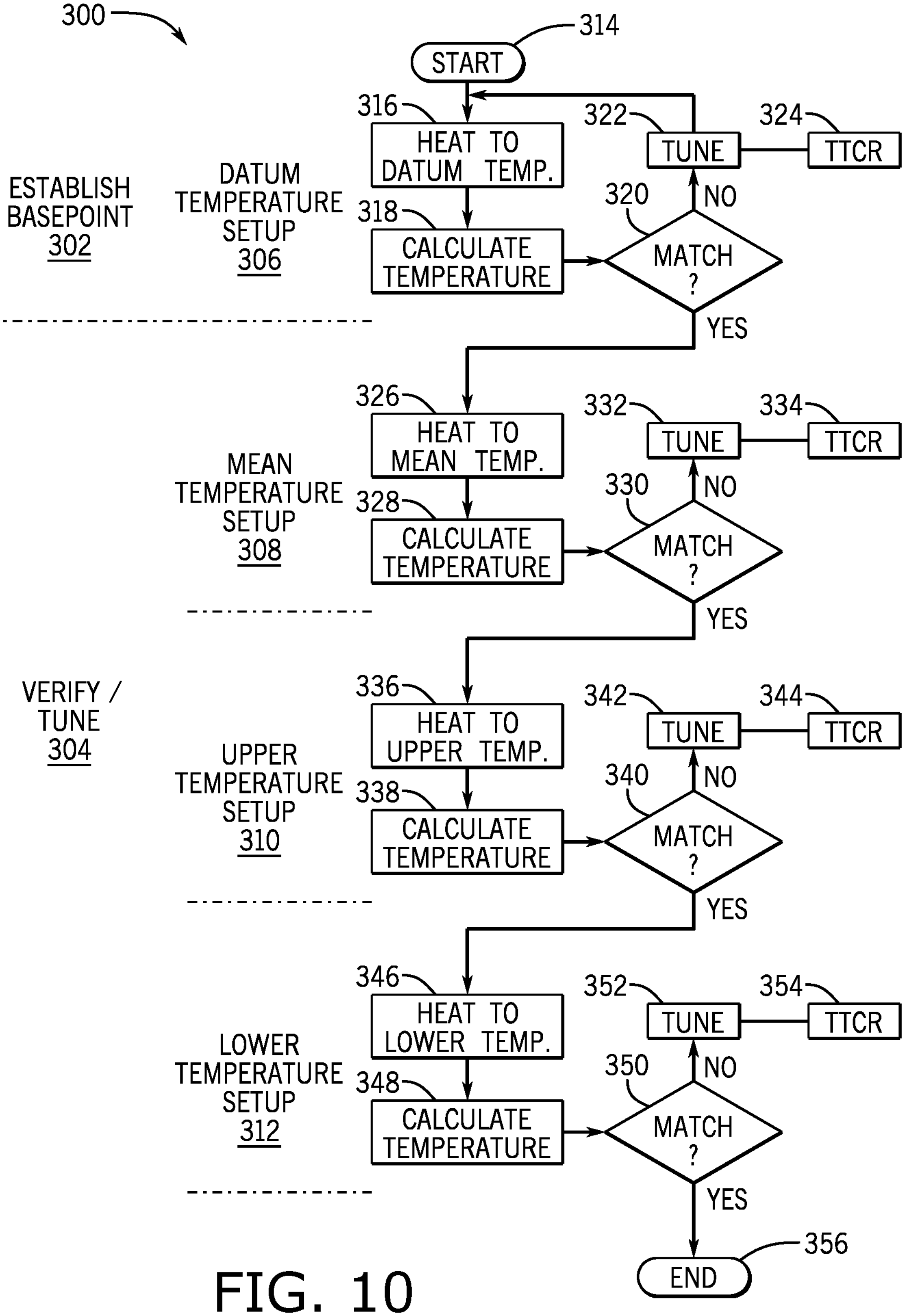
FIG. 10 is a flow diagram showing an example of a procedure(s) for using the system.

Referring now to FIG. 10, this flow diagram schematically represents a method of verifying and/or tuning heat-seal band performance in a heat seal machine, shown as procedure 300. Procedure 300 generally includes phases of establishing a basepoint 302 and verifying/tuning 304. These may include subphases such as datum temperature setup 306, mean temperature setup 308, and upper and lower temperature setups 310, 312.

Still referring to FIG. 10 and with background reference to FIG. 9, the procedure 300 may start at block 314. This particular exemplary procedure 300 shows thermal supplementation by conductively heating the heat-seal band 10 when the band is in its standby mode. At block 316, the heater 202A is heated to the datum temperature, as a created ambient or base temperature, which conductively heats the heat-seal band 10 to the same datum temperature. The predefined datum temperature is determined based on factors such as an ambient temperature of the heat-sealing machine's 18 end-use environment(s) typically within a range of about 0-degrees C. to about 35-degrees C. Whereas a cold-room type application may correspond to a datum temperature of between about 0-degrees C. and 2-degrees C., a clean-room type application may correspond to a datum temperature of between about 20-degrees C. and 22-degrees C. Control system 16 calculates the heat-seal band's 10 temperature at block 318, typically by evaluating voltage and current of the standby mode heat-seal band 10 and making corresponding resistance and temperature calculations. At decision block 320, if the actual temperature of the heat-seal band 10, which correspond to the temperature at which the constant temperature controller 220 commands the heater 202A to achieve, and its calculated temperature are different or sufficiently different, then a tuning procedure 322 may be performed. The tuning may include adjusting a parameter used in the temperature calculation, such as redefining the TCR (temperature coefficient resistance) to a different value, as a TTCR (tuned temperature coefficient resistance) value 324.

Still referring to FIG. 10 and with background reference to FIG. 9, if the actual and calculated heat-seal band datum temperatures match or sufficient match at decision block 320, then the constant temperature controller 220 commands the heater 202A to achieve a mean specification temperature for the heat-sealing procedure at block 326. Control system 16 calculates the mean specification temperature at block 328. If the actual and calculated mean specification temperature values are sufficiently mismatched at block 330, then at blocks 332 and 334, tuning, which may include implementing another TTCR is performed.

Still referring to FIG. 10 and with background reference to FIG. 9, if the actual and calculated heat-seal band mean specification temperatures match or sufficiently match at decision block 330, then the constant temperature controller 220 in this example commands the heater 202A to achieve an upper specification temperature, for example, an upper limit value of a range of acceptable values for the heat-sealing procedure, at block 336. Control system 16 calculates the upper specification temperature at block 338. If the actual and calculated upper temperature values are sufficiently mismatched at block 340, then at blocks 342 and 344, tuning, which may include implementing another TTCR is performed.

Still referring to FIG. 10 and with background reference to FIG. 9, if the actual and calculated upper specification temperatures match or sufficiently match at decision block 340, then the constant temperature controller 220 in this example commands the heater 202A to achieve a lower specification temperature, for example, a lower limit value of a range of acceptable values for the heat-sealing procedure, at block 346. Control system 16 calculates the lower specification temperature at block 348. If the actual and calculated upper temperature values are sufficiently mismatched at block 350, then at blocks 352 and 354, tuning, which may include implementing another TTCR is performed and the setup procedure(s) may end at block 356 if the values sufficiently match.

Although described primarily as controlling the heater 202A, it is understood that control system 16 may control cooler 202B in analogous ways. Furthermore, control system 16 may control both the heater 202A and cooler 202B at the same time or in sequence to achieve target temperatures or expedite reaching those temperatures for various phases or procedures while the heat-seal band 10 remains in its standby mode. Activating the cooler 202B can drive the temperature of the standby mode heat-seal band 10 back toward a default or datum temperature between various phases in a verification, validation, and/or tuning procedure. Activating the cooler 202B can also help stabilize the temperature of the thermal emitter device 7 at a target temperature during a verification, validation, and/or tuning procedure or can be implemented to expedite cooling between heat application phases during a heat-sealing procedure.

Other aspects and characteristics of the system 5 falling within the scope of the present invention are disclosed in the drawings attached hereto, the disclosure of which is expressly incorporated herein.

Many changes and modifications could be made to the invention without departing from the spirit thereof. The scope of these changes will become apparent from the appended claims.

What is claimed is:

1. A system for verifying and tuning a heat-seal band performance in a heat-sealing machine, the system comprising:

a heat-seal band mounted in the heat-sealing machine and defining:

a standby mode in which the heat-seal band defines a low energy state for monitoring a characteristic of the heat-seal band; and a heating mode in which the heat-seal band defines a high energy state for heating a workpiece during a heat-sealing procedure;

a thermal emitter device that directs heat into the heat-seal band during a heat verification procedure in which the heat-seal band is in the standby mode, wherein the thermal emitter device:

includes a heater that is selectively energized to conductively heat the heat-seal band during the heat-verification procedure;

is unmounted from the heat-sealing machine during the hear-sealing procedure; and is mounted in the heat-sealing machine during the heat verification procedure;

a heat-sealing tool that holds the heat-seal band;

a counter-tool that is aligned with the heat-sealing tool; and a constant temperature controller configured to selectively energize the heater for achieving and maintaining a temperature during the heat verification procedure, wherein during the heat verification procedure, the constant temperature controller:

commands an increase in temperature of the heater during the heat verification procedure to a heat-seal band target temperature that corresponds to an operational temperature of the heat-seal band when in the active heating mode during the heat-sealing procedure.

2. The system of claim 1, wherein:

the thermal emitter device includes a cooler that is configured to decrease the temperature of the heat-seal band when the heat-seal band is in the standby mode.

3. The system of claim 1 wherein:

the heater is configured to increase the temperature of the heat-seal band when the heat-seal band is in the standby mode; and the thermal emitter device includes a cooler that is configured to decrease the temperature of the heat-seal band when the heat-seal band is in the standby mode.

4. The system of claim 3, wherein:

the thermal emitter device supports the workpiece during the heat-sealing procedure.

5. The system of claim 4, wherein:

the cooler decreases the temperatures of the heat-seal band during cooling phases of the heat-sealing procedure.

6. The system of claim 4, wherein:

the cooler decreases the temperatures of the heat-seal band during cooling phases of a heat verification procedure.

7. The system of claim 1, wherein:

when in the heating mode during the heat-sealing procedure, the heat-seal band defines a heat generating state; and when in the standby mode during the heat verification procedure, the heat-seal band defines a heat absorbing state.

8. The system of claim 7, wherein:

when the heat-seal band is in the heat generating state, the heat-seal band is heated by way of resistive heating that corresponds to conducting electrical energy through the heat-seal band; and when the heat-seal band is in the heat absorbing state, the heat-seal band is heated by way of conductive heating through heat transferred from the thermal emitter device.

9. The system of claim 1, wherein:

the thermal emitter device is defined at the counter-tool.

10. The system of claim 1, herein during the heat verification procedure, the constant temperature controller:

maintains the temperature of the heater during the heat verification procedure to correspond to the heat-seal band target temperature.

11. The system of claim 10, further comprising a heat-sealing machine controller that evaluates a temperature of the heat-seal band during the heat verification procedure.

* * * * *